Patented Oct. 24, 1944

2,361,161

UNITED STATES PATENT OFFICE 2,361,161

BASIC FILLING FOR TOOTH CAVITIES

David Charles Anderson, Manhattan, Kans.

No Drawing. Application September 21, 1943,
Serial No. 503,305

2 Claims. (Cl. 106—35)

My invention relates to a paste to form the basic or preliminary filling of a tooth. That is to say, after a cavity in a tooth has been prepared for filling, cleaned and dried, a thin layer of this paste is first placed over the bottom of the cavity and preparatory to the ordinary filling. This is a precaution taken in order to prevent all irritation to the nerve ordinarily caused by contact with metallic or other types of fillings and this paste also acts as an insulation against thermal shock.

The paste if kept in properly sealed jars will remain pliable for months.

Immediately after this paste has been applied in the bottom of the cavity a permanent filling of selected composition may immediately be placed or packed over it until the cavity is filled.

The composition of this preparatory or basic filling paste is approximately the following:

| | | |
|---|---|---|
| Zinc oxide | drams | 4 |
| Thymol iodide | grains | 5 |
| Creosote | drops | 10 |
| Oil of cloves | do | 12 |

Lanolin sufficient to form a dry or very dry, solid paste.

These ingredients: Zinc oxide, thymol iodide, creosote and oil of cloves are mixed, in the proportions given, into lanolin of a sufficient quantity until a paste of desired consistency is obtained.

Within certain limits the here above given relative proportions may be varied.

It is to be understood that my invention as here described is not limited to the details as herein set forth, but that they may be varied widely without departing from the spirit of invention as defined by the claims.

Having described the invention, what is claimed as new is:

1. A preliminary filling for tooth cavities consisting of an intimate mixture in the form of a pliable paste of the following ingredients in approximate proportions: zinc oxide 4 drams, thymol iodide 5 grains, creosote 10 drops, oil of cloves 12 drops and lanolin sufficient for making a solid paste.

2. A method of preparing a pliable paste to form a preliminary filling to protect the nerves in a tooth cavity which consists in intimately mixing 4 drams of zinc oxide, 5 grains of thymol iodide, 10 drops of creosote, and 12 drops of oil of cloves in a sufficient amount of lanolin to obtain a solid, pliable paste.

DAVID CHARLES ANDERSON.